United States Patent
Odagaki

(10) Patent No.: US 6,286,886 B1
(45) Date of Patent: *Sep. 11, 2001

(54) SEAT ATTACHMENT STRUCTURE FOR MOTOR VEHICLES

(75) Inventor: Kunimichi Odagaki, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/591,945

(22) Filed: Jun. 12, 2000

Related U.S. Application Data

(62) Division of application No. 08/947,949, filed on Oct. 9, 1997, now Pat. No. 6,145,913.

(30) Foreign Application Priority Data

Oct. 29, 1996 (JP) .................................................... 8-287165
Jul. 25, 1997 (JP) .................................................... 9-200479

(51) Int. Cl.$^7$ ...................................................... B60N 2/02
(52) U.S. Cl. ...................................... 296/65.11; 296/65.03; 296/65.13; 297/344.1
(58) Field of Search ............................. 296/65.05, 65.11, 296/65.13, 65.03; 248/503.1; 297/344.1

(56) References Cited

U.S. PATENT DOCUMENTS

| | | | |
|---|---|---|---|
| 2,297,176 | * | 9/1942 | Thompson . |
| 2,839,312 | * | 6/1958 | Barenyi et al. . |
| 2,858,877 | * | 11/1958 | Krause . |
| 4,341,415 | * | 7/1982 | Braun et al. . |
| 4,834,452 | * | 5/1989 | Goodrich ............................. 297/240 |
| 5,275,370 | * | 1/1994 | Terai ..................................... 248/429 |
| 5,364,152 | * | 11/1994 | Mastrangelo et al. .............. 296/65.1 |
| 5,611,589 | * | 3/1997 | Fujii et al. ............................ 296/64 |
| 5,636,884 | * | 6/1997 | Ladetto et al. ...................... 296/65.1 |
| 5,697,662 | * | 12/1997 | Leftwich ............................... 296/63 |
| 5,765,894 | * | 7/1998 | Okazaki et al. ..................... 296/65.1 |
| 5,868,451 | * | 2/1999 | Uno et al. ............................. 296/66 |

FOREIGN PATENT DOCUMENTS 63145145   6/1988 (JP) .

* cited by examiner

Primary Examiner—Joseph D. Pape
(74) Attorney, Agent, or Firm—Carrier Blackman & Associates; Joseph P. Carrier; William D. Blackman

(57) ABSTRACT

A seat a seat arrangement and attachment structure in a motor vehicle comprises at least two rows of passenger's seats arranged in a longitudinal direction of the motor vehicle, including one row and another row defined by at least two passenger's seats juxtaposed transversely across a passenger compartment of the motor vehicle, wherein one of the passenger's seats is disposed adjacent to a lateral side of the motor vehicle, transverse rails for supporting another of the passenger's seat for movement from a position closely adjacent to the one passenger's seat in a transverse direction of the motor vehicle, to a side position in the passenger compartment which is spaced from the one passenger's seat in the transverse direction; a first holder for holding said other passenger's seat in the position closely adjacent to the one passenger's seat, and a second holder for holding the other passenger's seat in the side position in the passenger compartment which is spaced from the one passenger's seat in said transverse direction.

4 Claims, 16 Drawing Sheets

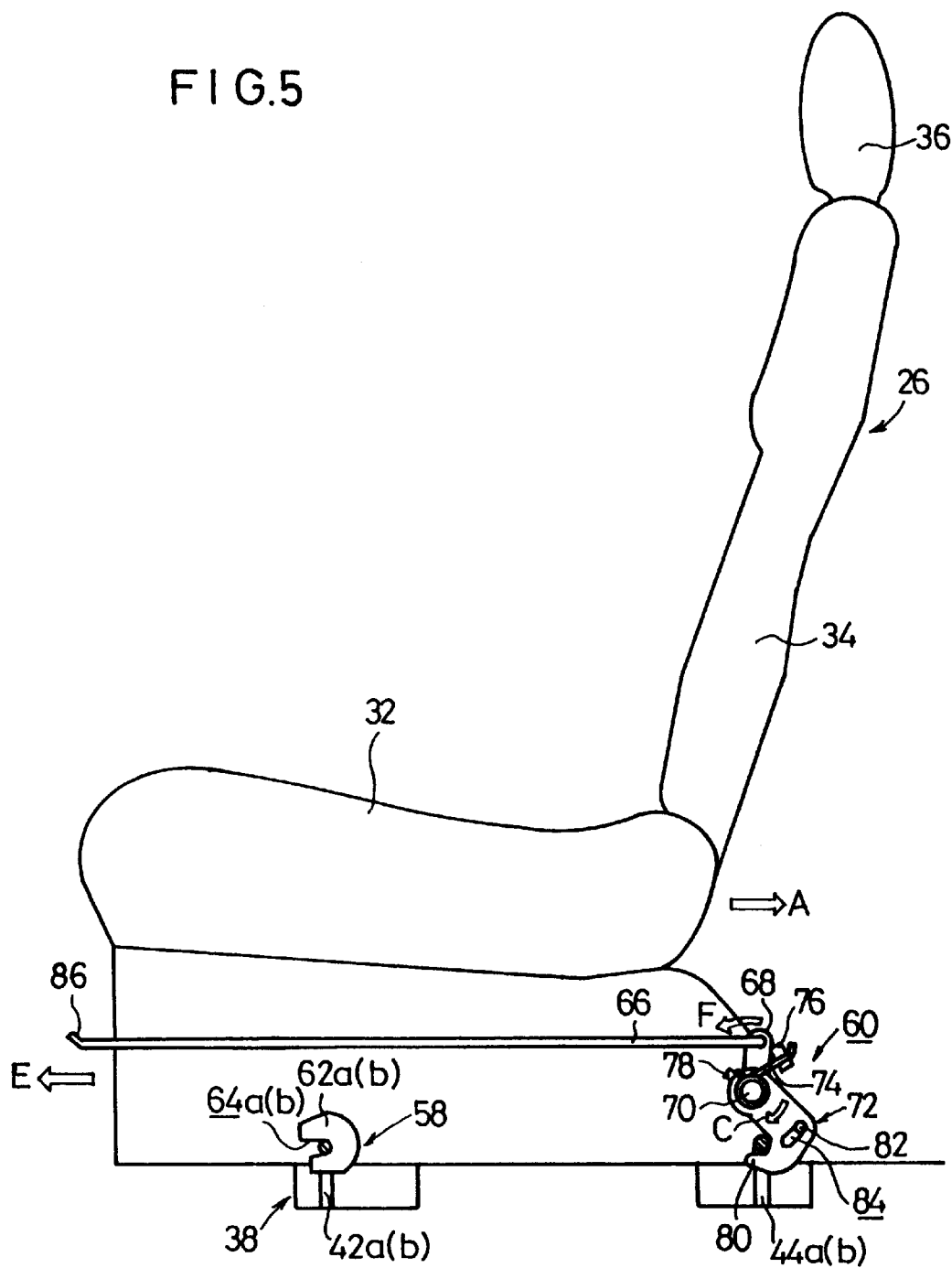
F I G.5

SEAT ATTACHMENT STRUCTURE FOR MOTOR VEHICLES

This is a divisional application of prior application U.S. Ser. No. 08/947,949 filed Oct. 9, 1997 now U.S. Pat. No. 6,145,913. The entire disclosure of the prior application U.S. Ser. No. 08/947,949 is considered as being part of the disclosure of the accompanying application and is hereby incorporated by reference therein.

BACKGROUND OF THE INVENTION

1. Field of the Invention

The present invention relates to a seat attachment structure for installing at least two passenger's seats juxtaposed transversely across the passenger compartment of a motor vehicle.

2. Description of the Related Art

Recent years have seen widespread popularity among car drivers of various types of motor vehicles including wagon-type vehicles and recreational vehicles (RVs). These motor vehicles have a walk-through layout that allows passengers to move easily from the first row to second or third row of passenger's seats along a walk-through passage between laterally spaced passenger's seats.

FIGS. 16 and 17 of the accompanying drawings show proposed structures that allow passengers to move along a walk-through passage between passenger's seats in motor vehicles.

As shown in FIG. 16, the passenger compartment of a motor vehicle 1a accommodates front seats 2a, first rear seats 3a, and second rear seats 4a that are arrayed successively backward in the longitudinal direction of the motor vehicle 1a indicated by the arrow A. The first rear seats 3a are located closely to respective side doors 6, 7. A central straight walk-through passage 5a is defined continuously between the front seats 2a and also between the first rear seats 3a, as indicated by the arrow X.

Another motor vehicle 1b shown in FIG. 17 has front seats 2b, first rear seats 3b, and second rear seats 4b that are accommodated in the passenger compartment thereof. The first rear seats 3b jointly have a bench seat configuration and are positioned more closely to one side of the motor vehicle 1b, i.e., a side door 6 thereof, than to the other side of the motor vehicle 1b, i.e., a side door 7 thereof. A tortuous walk-through passage 5b is defined continuously between the front seats 2b and also between the first rear seats 3b and the side door 7 of the motor vehicle 1b, as indicated by the arrow Y.

In the motor vehicle 1a shown in FIG. 16, the first rear seats 3a are located closely to the side doors 6, 7. Therefore, the first rear seats 3a possibly tend to present an obstacle to a passenger who wants to get onto the first rear seats 3a by opening the side door 6 or the side door 7.

The motor vehicle 1b shown in FIG. 17 permits a passenger to get easily onto the second rear seat 3b by opening the side door 7 because of the space present between the first rear seats 3b and the side door 7. However, since the walk-through passage 5b is tortuous in the passenger compartment, passengers find it awkward to move through along the walk-through passage 5b.

Users chose between the different vehicle types shown in FIGS. 16 and 17 taking into account the advantages and disadvantages thereof. However, the advantages and disadvantages vary among users of different ages, physical conditions, etc., and it will be difficult for one vehicle type to satisfy needs of a wide range of various users.

As disclosed in Japanese patent publication No. 7-23071, there has been known a seat assembly for use behind a driver's seat in a motor vehicle, the seat assembly comprising a pair of separate seats independent of each other which are slidable toward and away from each other.

In the disclosed seat assembly, a base frame supports a pair of telescopic guide rails having ends fixed thereto, and each of the independent seats is fixed to other ends of the guide rails. The guide rails are inclined a certain angle to the longitudinal direction of the motor vehicle. The independent seats supported on the telescopic guide rails are each slidable between a front position and a rear position by and along the telescopic rails. Since the guide rails are inclined to the longitudinal direction of the motor vehicle, the independent seats cannot be moved in the transverse direction of the motor vehicle.

With one of the independent seats fixed in position, the other independent seat is slid to establish a walk-through passage selectively between the independent seats and between the other independent seat and a side door of the motor vehicle. In either one of these seat layouts, the independent seats are not aligned with each other in the transverse direction of the motor vehicle.

SUMMARY OF THE INVENTION

It is a principal object of the present invention to provide a motor vehicle seat attachment structure which allows passenger's seats to move transversely of a motor vehicle depending on how the passenger's seats are to be used, and which is highly versatile to meet various different modes of use of the passenger's seats.

According to the invention, there is provided a seat arrangement and attachment structure in a motor vehicle comprising: at least two rows of passenger's seats arranged in a longitudinal direction of the motor vehicle, including one row and another row defined by at least two passenger's seats juxtaposed transversely across a passenger compartment of the motor vehicle, wherein one of said passenger's seats is disposed adjacent to a lateral side of the motor vehicle; transverse rails for supporting another of said passenger's seat for movement from a position closely adjacent to said one passenger's seat in a transverse direction of the motor vehicle, to a side position in the passenger compartment which is spaced from said one passenger's seat in said transverse direction; a first holder for holding said other passenger's seat in the position closely adjacent to said one passenger's seat; and a second holder for holding said other passenger's seat in said side position in the passenger compartment which is spaced from said one passenger's seat in said transverse direction. The first holder and second holder including engaging members fixed respectively to the transverse rails in predetermined positions, movable guides engaging the transverse rails for sliding movement in the transverse direction, latches angularly movably mounted on the movable guides, for engaging the engaging members, and a control lever coupled through a drive wire to the latches, for releasing the latches out of engagement with the engaging member.

Such seat arrangement and attachment structure according to the invention desirably permits the passenger's seats may be positioned closely to each other to form a bench seat, providing a walk-through passage across the side position of the passenger's compartment, or spaced from each other as captain seats, providing a central walk-through passage between the passenger's seats. Since at least one of the passenger's seats is thus selectively movable depending on the demand of the user, the seat attachment structure of the invention makes the passenger's seats versatile in use.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a side elevational view of the seat attachment structure according to the first embodiment;

DETAILED DESCRIPTION OF THE PREFERRED EMBODIMENTS

Figure 1:
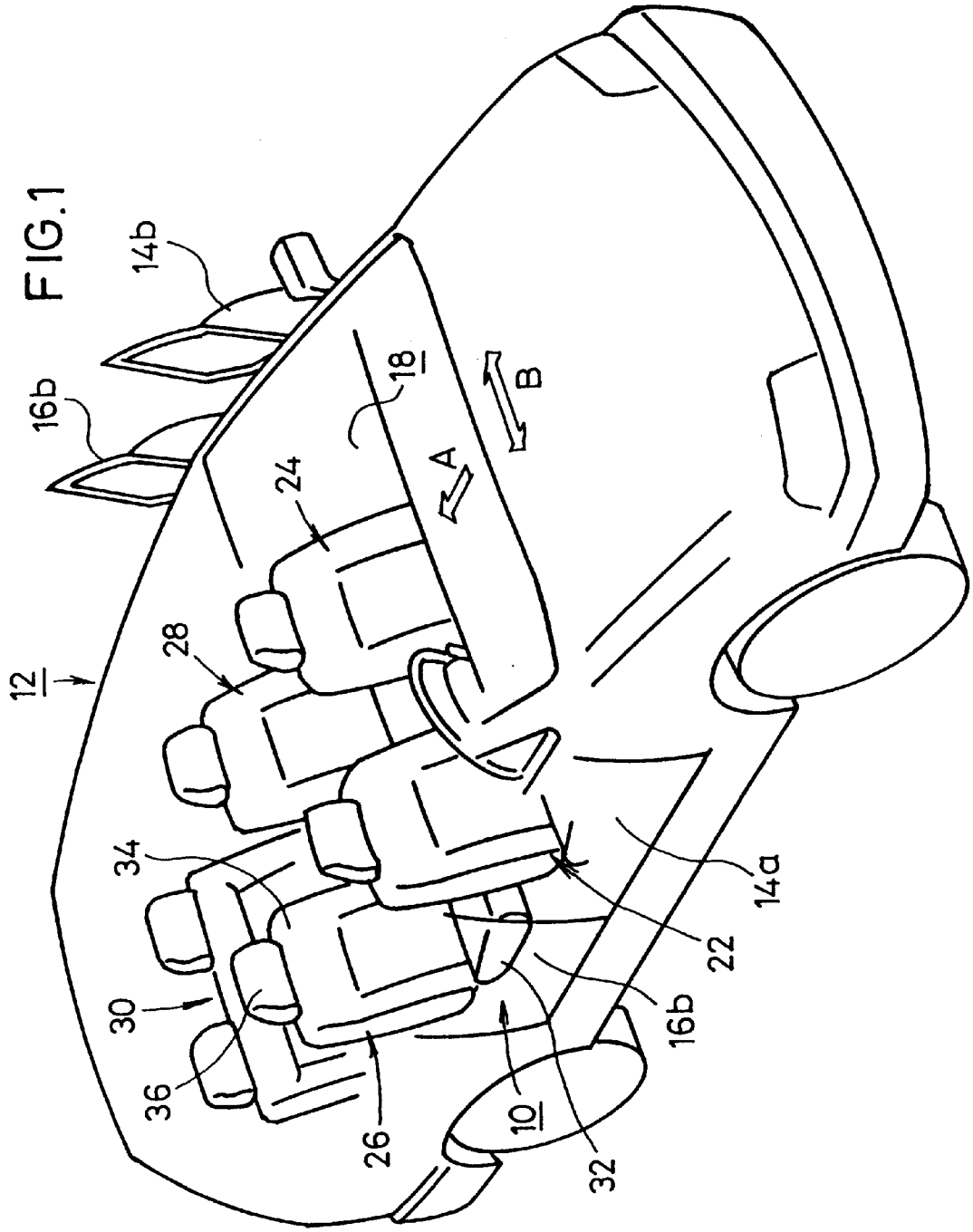
FIG. 1 is a schematic perspective view of a motor vehicle that incorporates a seat attachment structure according to a first embodiment of the present invention.
Figure 2:
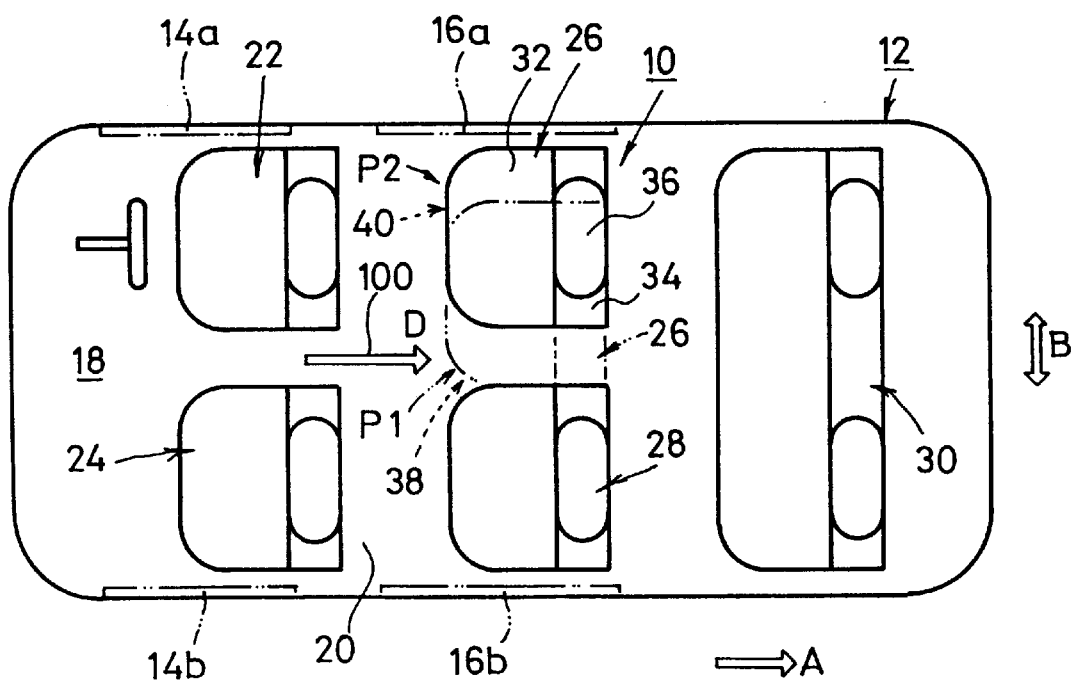
FIG. 2 is a plan view of the passenger's compartment of the motor vehicle shown in FIG. 1.

As shown in FIGS. 1 and 2, a seat arrangement and attachment structure 10 according to a first embodiment of the present invention is incorporated in a motor vehicle 12 which is of a wagon type. As discussed further below, the seat arrangement and attachment structure generally will include at least two rows of passenger's seats arranged in a longitudinal direction of the motor vehicle, including a first row of passenger's seats and another row defined by at least one additional passenger's (which may be a bench seat) arranged behind the one row, and wherein at least one of the passenger's seats is disposed adjacent a side door of the motor vehicle.

The motor vehicle 12 has two front doors 14a, 14b and two side doors 16a, 16b that are used to open and close a passenger's compartment 18. The passenger's compartment 18 accommodates therein front seats 22, 24, first rear seats 26, 28, and a second rear seat (bench seat) 30 supported on a floor 20 and arrayed successively backward in the longitudinal direction of the motor vehicle 12 indicated by the arrow A. Each of the first rear seats 26, 28 are combined with the seat attachment structure 10.

The first rear seat 26 comprises a seat cushion 32, a seatback 34 extending substantially upwardly from a rear edge of the seat bottom 32, and a headrest 36 removably mounted on an upper end of the seatback 34. The second rear seat 28 is identical in structure to the first rear seat 26, and will not be described in detail below.

The seat attachment structure 10 comprises a first holder 38 for holding the first rear seat 26 in a first position P1 close to the second rear seat 28, and a second holder 40 for holding the first rear seat 26 in a second position P2 spaced from the second rear seat 28, i.e., close to the side door 16a.

Figure 3:
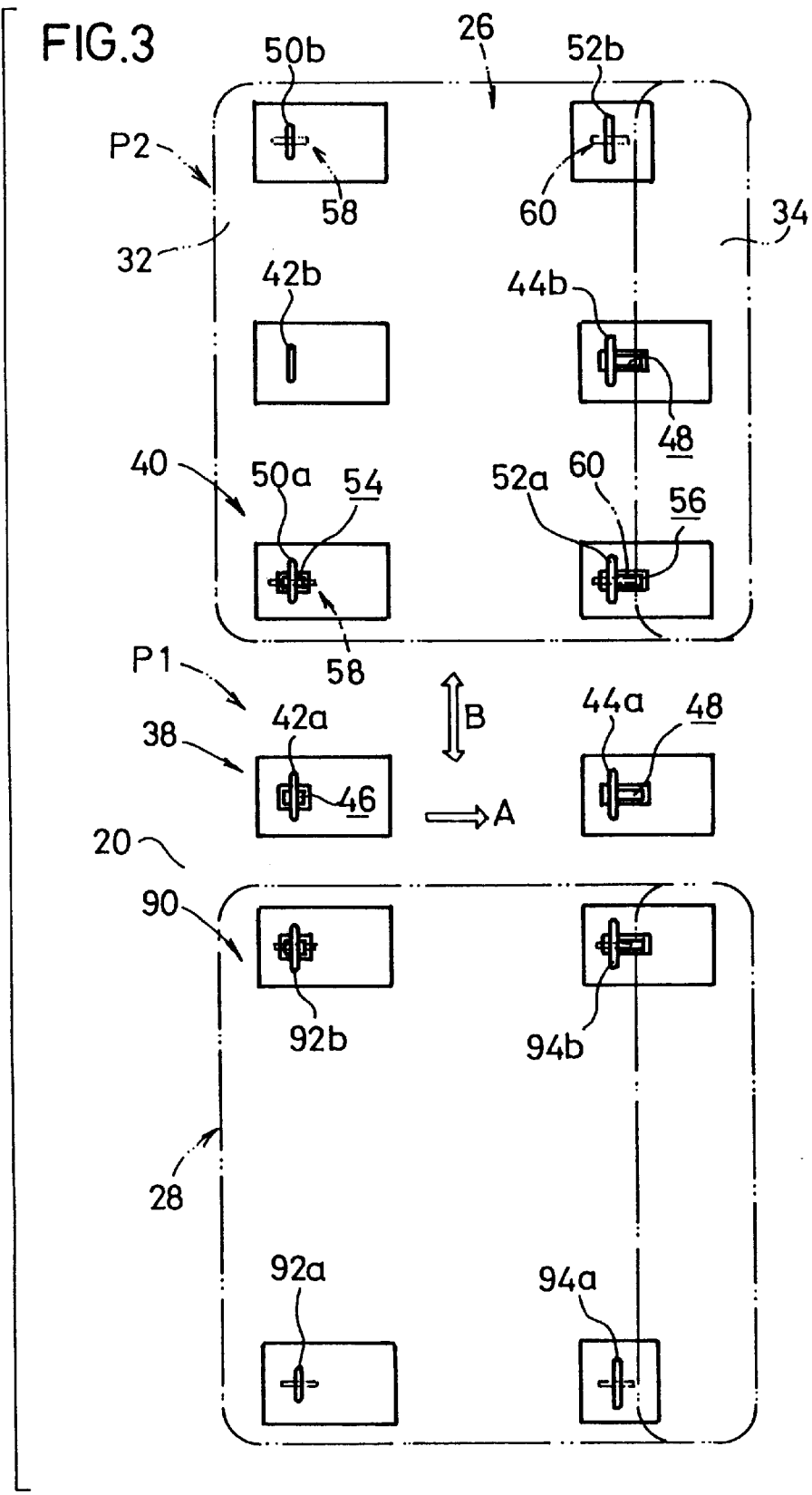
FIG. 3 is a plan view of first and second holders of the seat attachment structure according to the first embodiment.

As shown in FIG. 3, the first holder 38 comprises a pair of first engaging rods 42a, 42b mounted on the floor 20 and spaced a predetermined distance from each other in the transverse direction of the motor vehicle 10 as indicated by the arrow B, and a pair of first strikers 44a, 44b mounted on the floor 20 and spaced backward a predetermined distance from the respective first engaging rods 42a, 42b in the longitudinal direction of the motor vehicle 10 as indicated by the arrow A.

Figure 4:
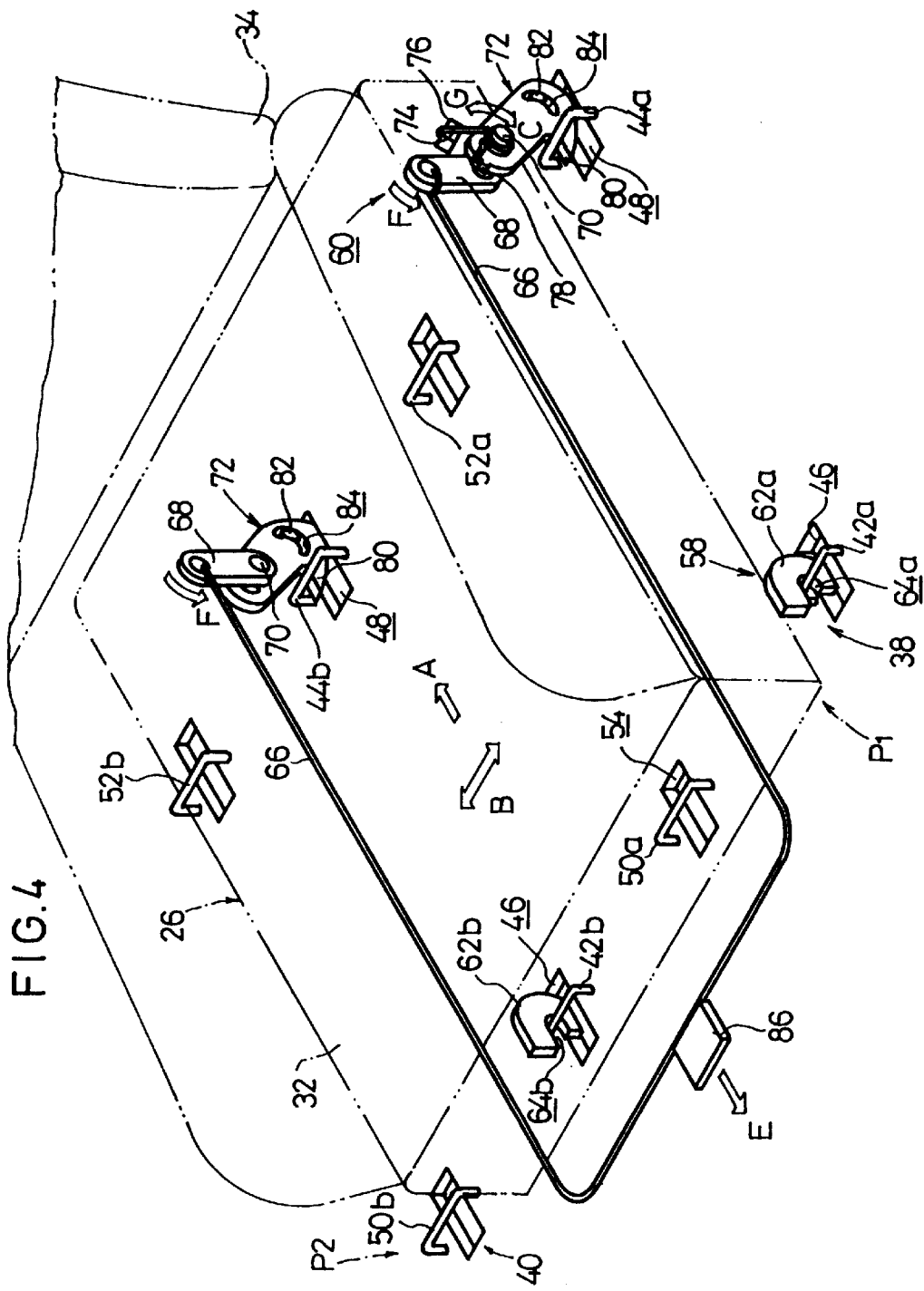
FIG. 4 is a perspective view of the seat attachment structure according to the first embodiment.

As shown in FIG. 4, each of the first engaging rods 42a, 42b comprises a substantially U-shaped loop with its ends driven into the floor 20, and the floor 20 has clearance recesses 46 defined therein below the respective first engaging rods 42a, 42b. Similarly, each of the first strikers 44a, 44b comprises a substantially U-shaped loop with its ends driven into the floor 20, and the floor 20 has clearance recesses 48 defined therein below the respective first strikers 44a, 44b.

The second holder 40 comprises a pair of second engaging rods 50a, 50b mounted on the floor 20 in sandwiching relation to the first engaging rod 42b and spaced a predetermined distance from each other in the transverse direction of the motor vehicle 10 as indicated by the arrow B, and a pair of second strikers 52a, 52b mounted on the floor 20 in sandwiching relation to the first striker 44b and spaced backward a predetermined distance from the respective second engaging rods 50a, 50b in the longitudinal direction of the motor vehicle 10 as indicated by the arrow A.

Each of the second engaging rods 50a, 50b comprises a substantially U-shaped loop with its ends driven into the floor 20, and the floor 20 has clearance recesses 54 defined therein below the respective second engaging rods 50a, 50b. Similarly, each of the second strikers 52a, 52b comprises a substantially U-shaped loop with its ends driven into the floor 20, and the floor 20 has clearance recesses 56 defined therein below the respective second strikers 52a, 52b.

As shown in FIGS. 4 and 5, the first rear seat 26 has a retainer mechanism 58 and a lock mechanism 60 mounted on both sides of a lower base of the seat cushion 32 of the first rear seat 26, for securing the first rear seat 26 selectively to the first holder 38 and the second holder 40. The retainer mechanism 58 and the lock mechanism 60 are spaced from each other in the longitudinal direction of the motor vehicle 12. The retainer mechanism 58 has a pair of hooks 62a, 62b fixed to a front portion of the lower base of the seat cushion 32. The hooks 62a, 62b are laterally spaced a distance equal to the distance by which the first engaging rods 42a, 42b or the second engaging rods 50a, 50b are spaced from each other. The hooks 62a, 62b have respective retaining grooves 64a, 64b defined therein which extend horizontally.

The lock mechanism 60 has a pair of laterally spaced levers 68 mounted on a rear portion of the lower base of the seat cushion 32. The levers 68 have ends connected to rear ends of respective drive wires 66, and other ends fixed to respective shafts 70. The lock mechanism 60 also has a pair of latches 72 having ends fixed to the shafts 70, respectively. Helical springs 74 disposed around the respective shafts 70 have ends engaging respective engaging members 76 fixed to a frame (not shown) and other ends engaging protrusions 78 on the latches 72.

The helical springs 74 normally urge the latches 72 to turn about the shafts 70 in the direction indicated by the arrow C. The latches 72 have respective fingers 80 on the other ends thereof and also have respective grooves 84 defined therein in which guide pins 82 fixed to the non-illustrated frame are fitted. The drive wires 66 extend forward along the seat cushion 32 and have respective front ends connected to a control tab 86.

As shown in FIG. 3, the first rear seat 28 is held in a side position in the passenger's compartment near the side door 16b by a third holder 90. As with the first and second holders 38, 40, the third holder 90 has a pair of third engaging rods 92a, 92b laterally spaced a predetermined distance from each other and a pair of third strikers 94a, 94b spaced backward a predetermined distance from the respective third engaging rods 92a, 92b in the longitudinal direction of the motor vehicle 10 as indicated by the arrow A. The seat cushion 32 of the first rear seat 28 has a retainer mechanism and a lock mechanism (both not shown) which are identical to the retainer mechanism 58 and the lock mechanism 60, respectively, of the first rear seat 26.

Operation of the seat attachment structure 10 will be described below.

Figure 6:
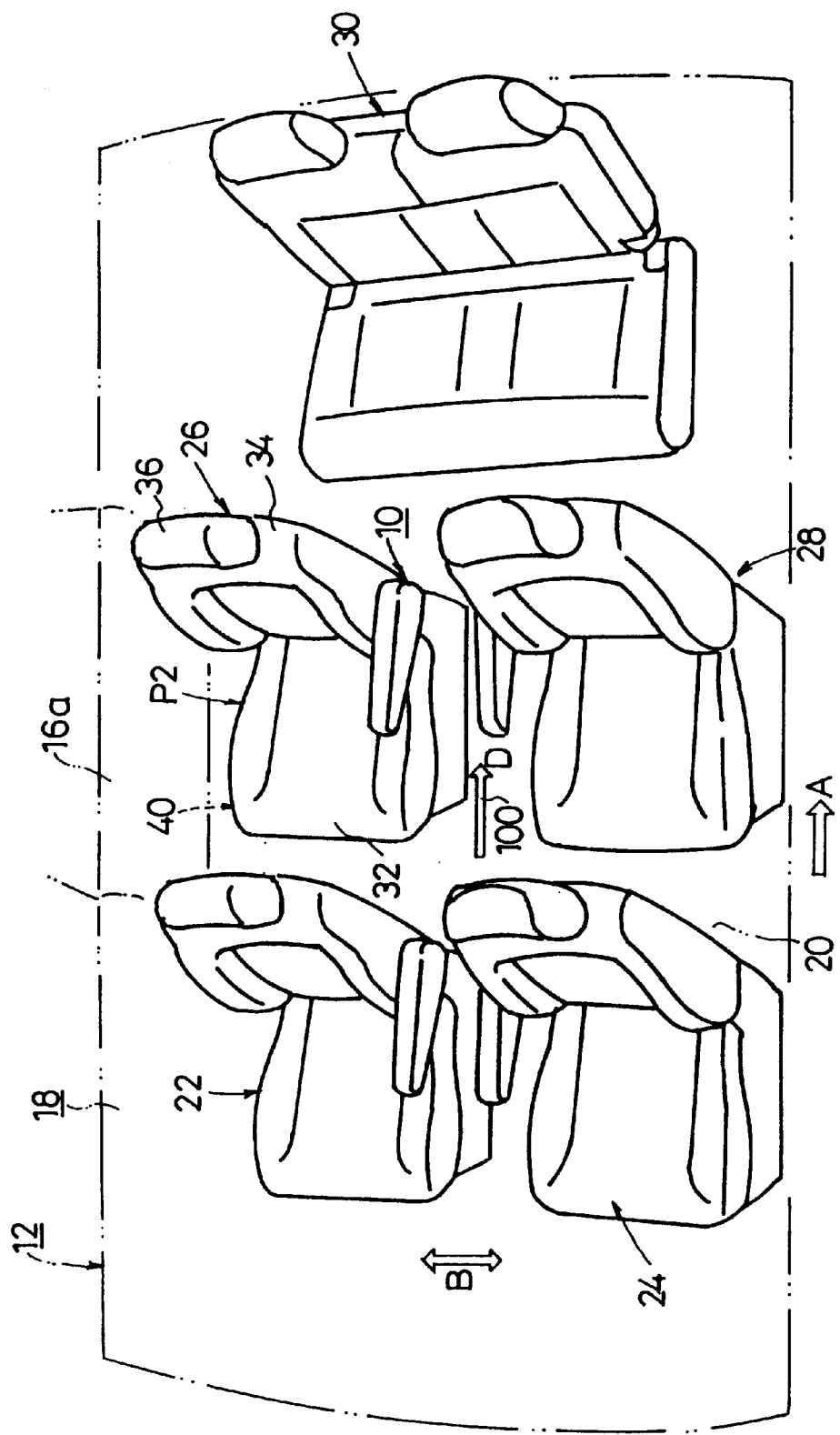
FIG. 6 is a perspective view of the passenger's compartment, showing first rear seats that are spaced from each other.

As shown in FIGS. 2, 3, and 6, when the first rear seat 26 is held in the second position P2 by the second holder 40, the first rear seat 26 is positioned closely to the side door 16a, and the first rear seat 28 is positioned closely to the side door 16b, with a space left between the first rear seats 26, 28. The space between the first rear seats 26, 28 provides a straight walk-through passage 100 extending straight from between the front seats 22, 24 through between the first rear seats 26, 28 to the second rear seat 30 in the direction indicated by the arrow D. This seat configuration is referred to as a so-called captain seat mode in which passengers are allowed to move quite easily in the passenger's compartment 18.

The first rear seat 26 can be moved closely to the first rear seat 28 as follows: As shown in FIGS. 4 and 5, when a user pulls the control tab 86 forward in the direction indicated by the arrow E, the drive wires 66 coupled to the control tab 86 are also pulled forward in the direction indicated by the arrow E. Therefore, the levers 68 engaging the drive wires 66 are angularly moved about the shafts 70 in the direction indicated by the arrow F, turning the shafts 70 against the bias of the helical springs 74. The latches 72 fixed to the shafts 70 are turned in a direction opposite to the direction indicated by the arrow C, releasing the fingers 80 out of engagement with the respective second strikers 52a, 52b of the second holder 40.

Then, the rear end of the seat cushion 32 of the first rear seat 26 is tilted upwardly, and the second engaging rods 50a, 50b are removed respectively from the retaining grooves 64a, 64b in the hooks 62a, 62b of the retainer mechanism 58 on the front portion of the seat cushion 32. The seat cushion 32 is now detached from the second holder 40 as shown in FIG. 7.

Figure 7:
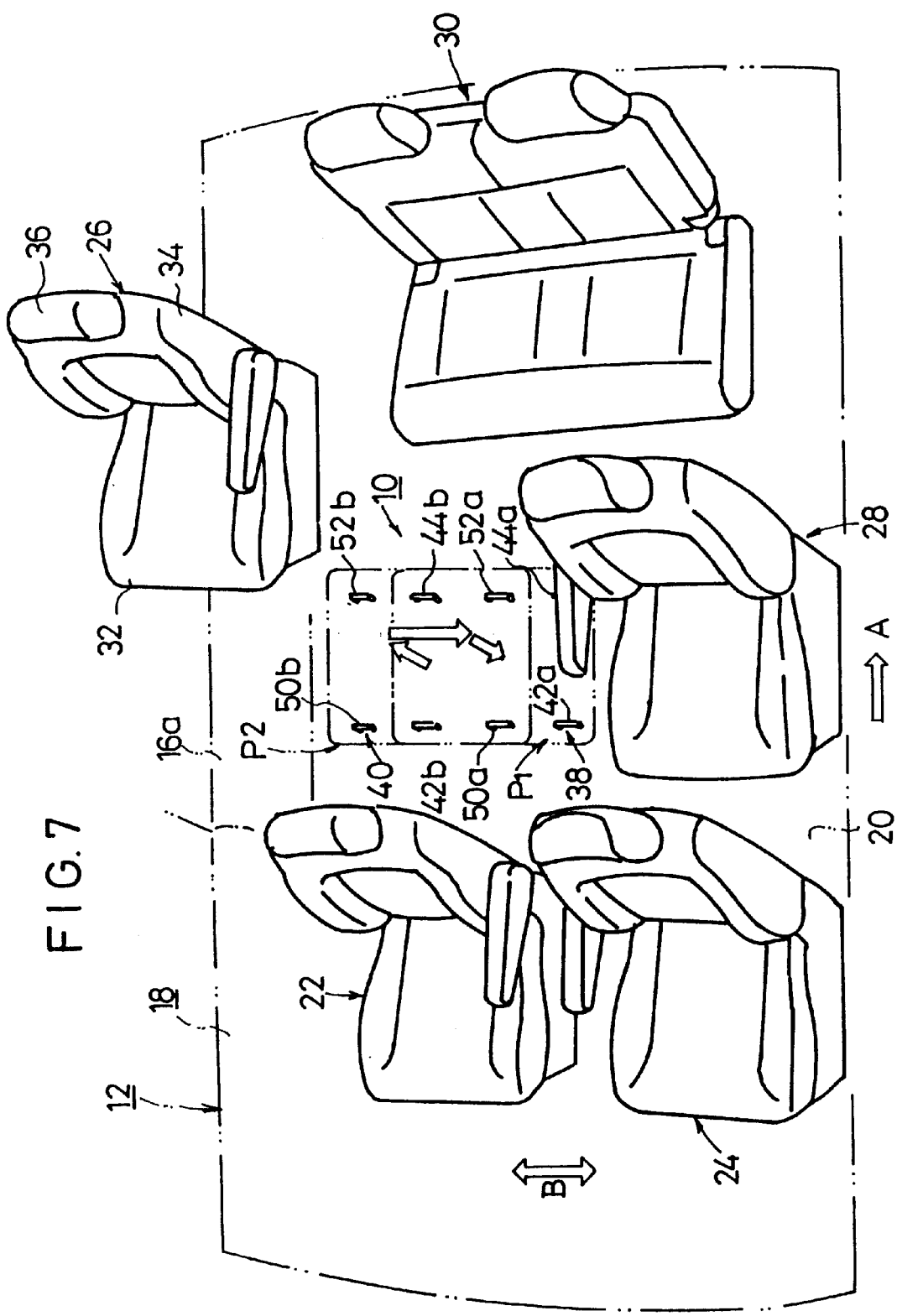
FIG. 7 is a perspective view of the passenger's compartment, showing the manner in which one of the first rear seats is moved from the first holder to the second holder.

Thereafter, the first rear seat 26 is moved from a position above the second holder 40 to a position above the first holder 38, as indicated by the arrow in FIG. 7, and then lowered toward the first holder 38. The first engaging rods 42a, 42b of the first holder 38 are brought respectively into the retaining grooves 64a, 64b in the hooks 62a, 62b of the retainer mechanism 58 on the front portion of the seat cushion 32.

While the control tab 86 is being pulled to keep the latches 72 at an angle in the direction indicated by the arrow G (see FIG. 4) with the guide pins 82 guided by the grooves 84, the latches 72 are lowered toward the respective first strikers 44a, 44b. Then, the control tab 86 is released, allowing the latches 72 to be angularly displaced with the shafts 70 in the direction indicated by the arrow C under the bias of the helical springs 74, until the fingers 80 move below the first strikers 44a, 44b and are locked on the first strikers 44a, 44b.

Figure 8:
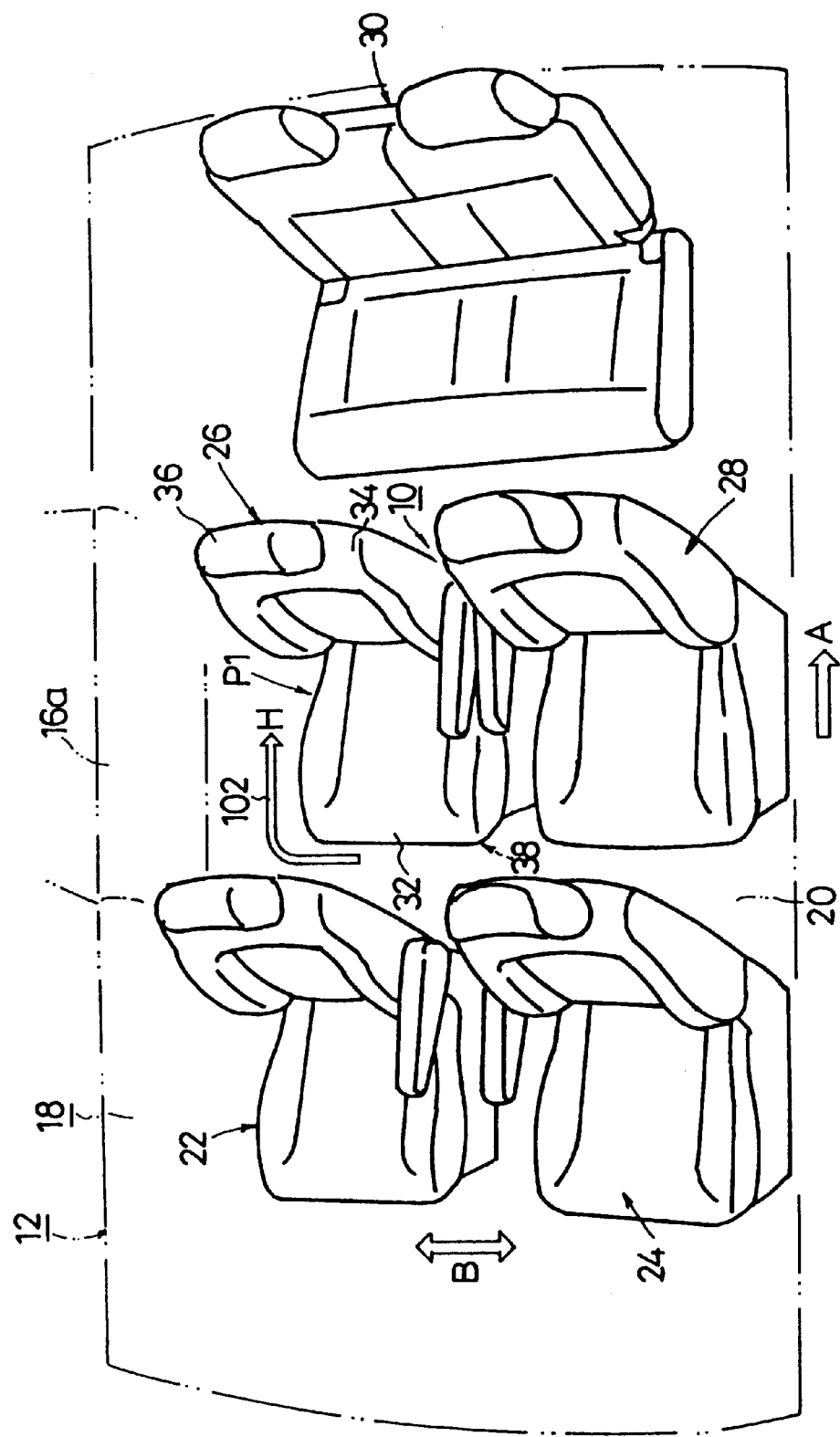
FIG. 8 is a perspective view of the passenger's compartment, showing one of the first rear seats as being positioned closely to the other of the first rear seats.

The first rear seat 26 is now held in the first position P1 by the first holder 38. As shown in FIG. 8, the first rear seat 26 and the first rear seat 28 are held in abutment against each other in the first position P1, creating a space between the first rear seat 26 and the side door 16a. Therefore, a bent walk-through passage 102 is defined which extends from between the front seats 22, 24 through between the first rear seat 26 and the side door 16a to the second rear seat 30, as indicated by the arrow H. This seat configuration is referred to as a so-called bench seat mode.

Since the bent walk-through passage 102 includes the space between the first rear seat 26 and the side door 16a, it allows a passenger to get smoothly onto and off the second rear seat 30 through the side door 16a without being obstructed by the first rear seat 26 which has been laterally shifted closely to the first rear seat 28.

In the first embodiment, as described above, the first rear seats 26, 28 are juxtaposed in the transverse direction of the motor vehicle 12 as indicated by the arrow B. The first rear seat 28 is disposed closely to the side door 16b in the passenger's compartment 18, and the first rear seat 26 is can be located selectively in the first position P1 close to the first rear seat 28 and the second position P2 spaced from the first rear seat 28 and close to the side door 16a, using the first and second holders 38, 40.

Demands to create the straight walk-through passage 100 that provides a central walk-though layout as shown in FIG. 6 and also to allow a passenger to get smoothly onto and off the second rear seat 30 through the side door 16a can thus easily be met simply by moving the first rear seat 26 with respect to the first rear seat 28. Consequently, the seat attachment structure 10 permits a seat layout of the motor vehicle 12 to be easily changed according to user's demands, and makes the motor vehicle 12 modifiable to meet demands of various users.

The first and second holders 38, 40 are only required to have the first engaging rods 42a, 42b, the second engaging rods 50a, 50b, the first strikers 44a, 44b, and the second strikers 52a, 52b. Therefore, the seat attachment structure 10 is highly simple in overall construction. Further, large free room, such as for baggage etc., can be obtained on the floor 20 by detaching the whole of the first and/or second rear seats 26, 28 off the floor 20.

In the first embodiment, the seat cushion 32 has the lock mechanism 60 shown in FIGS. 4 and 5. The lock mechanism 60 may be replaced with a lock mechanism 120 shown in FIG. 9.

Figure 9:
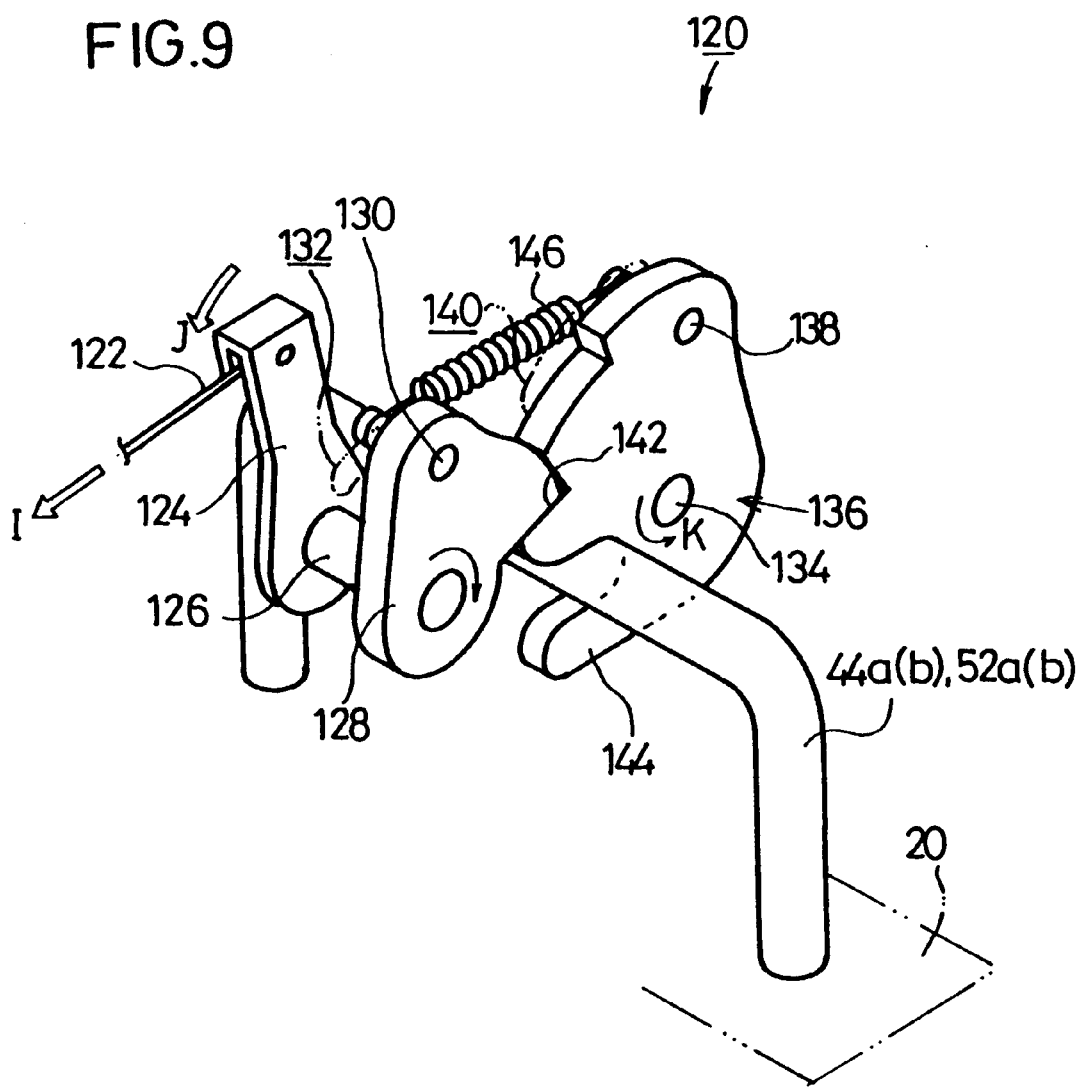
FIG. 9 is a perspective view of another lock device for the seat attachment structure.

As shown in FIG. 9, the lock mechanism 120 comprises a lever 124 having an end connected to an end of a drive wire 122. A cam 128 is coupled to an opposite end of the lever 124 by a shaft 126. The cam 128 is limited in its angular movement to a certain angular range by a guide pin 130 mounted thereon and received in a guide groove 132. A latch 136 angularly movable about a shaft 134 for engagement with the cam 128 is limited in its angular movement to a certain angular range by a guide pin 138 mounted thereon and received in a guide groove 140.

The latch 136 has a recess 142 defined in a peripheral surface thereof for engagement with the cam 128 and a finger 144 projecting from the peripheral surface thereof for engagement with the first strikers 44a, 44b or the second strikers 52a, 52b. The cam 128 and the latch 136 are normally urged to turn about the respective shafts 126, 134 in the directions indicated by the arrows under the bias of a helical spring 146 that is connected to and extends between the guide pins 130, 138.

When the drive wire 122 is pulled in the direction indicated by the arrow I, the lever 124 is turned in the direction indicated by the arrow J and the cam 128 is also turned together with the shaft 126 in the direction indicated by the arrow J. The cam 128 is displaced out of the recess 142 of the latch 136, which is then turned in the direction indicated by the arrow K under the bias of the helical spring 146 while being guided by the guide pin 138 received in the guide groove 140. The lock mechanism 120 can thus serve the same purpose as the lock mechanism 60 for keeping the seat cushion 32 in the first position P1 or the second position P2.

A seat attachment structure 200 according to a second embodiment of the present invention will be described below with reference to FIGS. 10 through 13. Those parts of the seat attachment structure 200 which are identical to those of the seat attachment structure 10 are denoted by identical reference characters and will not be described in detail below.

Figure 10:
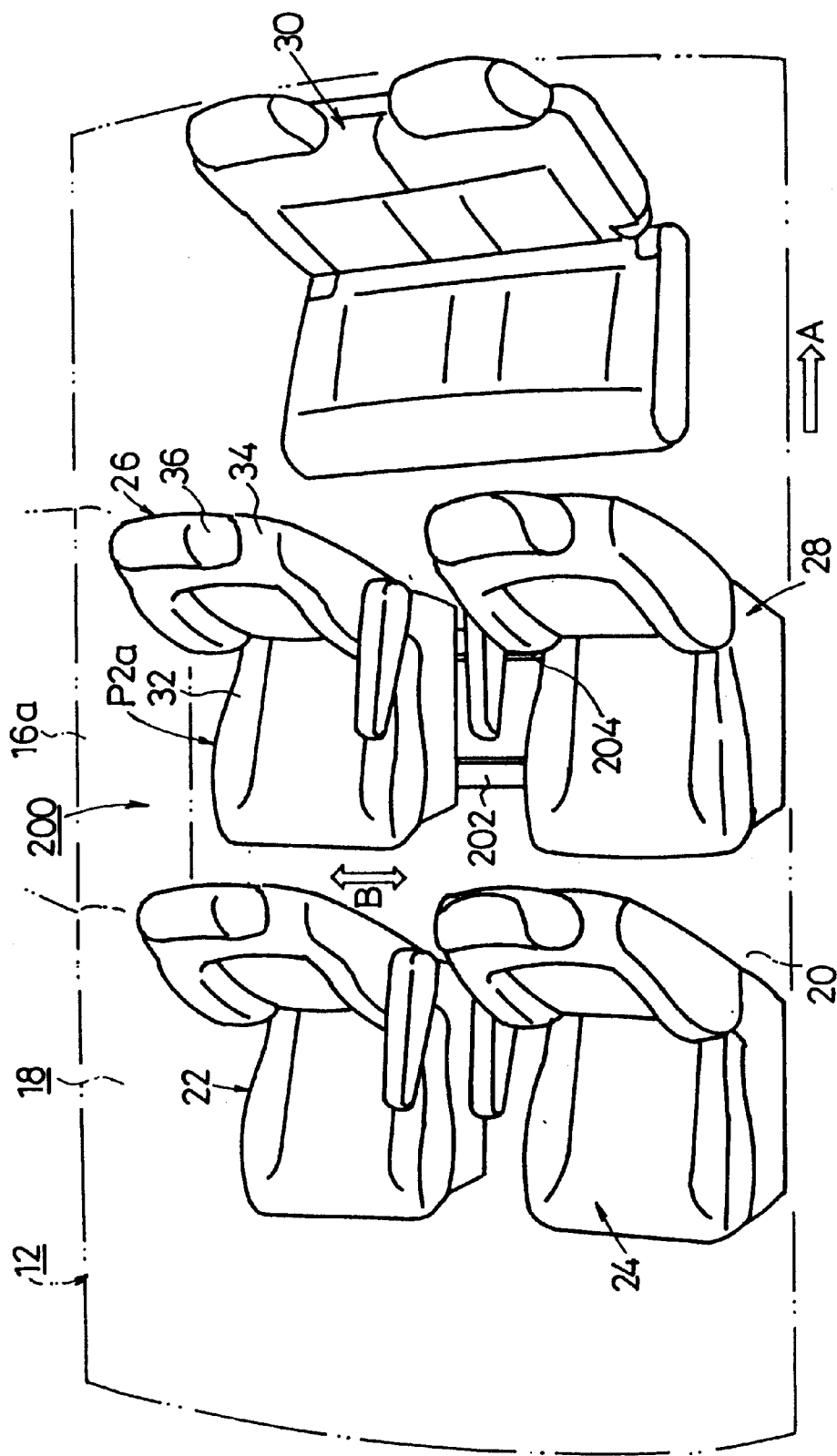
FIG. 10 is a schematic perspective view of the passenger's compartment of a motor vehicle which incorporates a seat attachment structure according to a second embodiment of the present invention.
Figure 11:
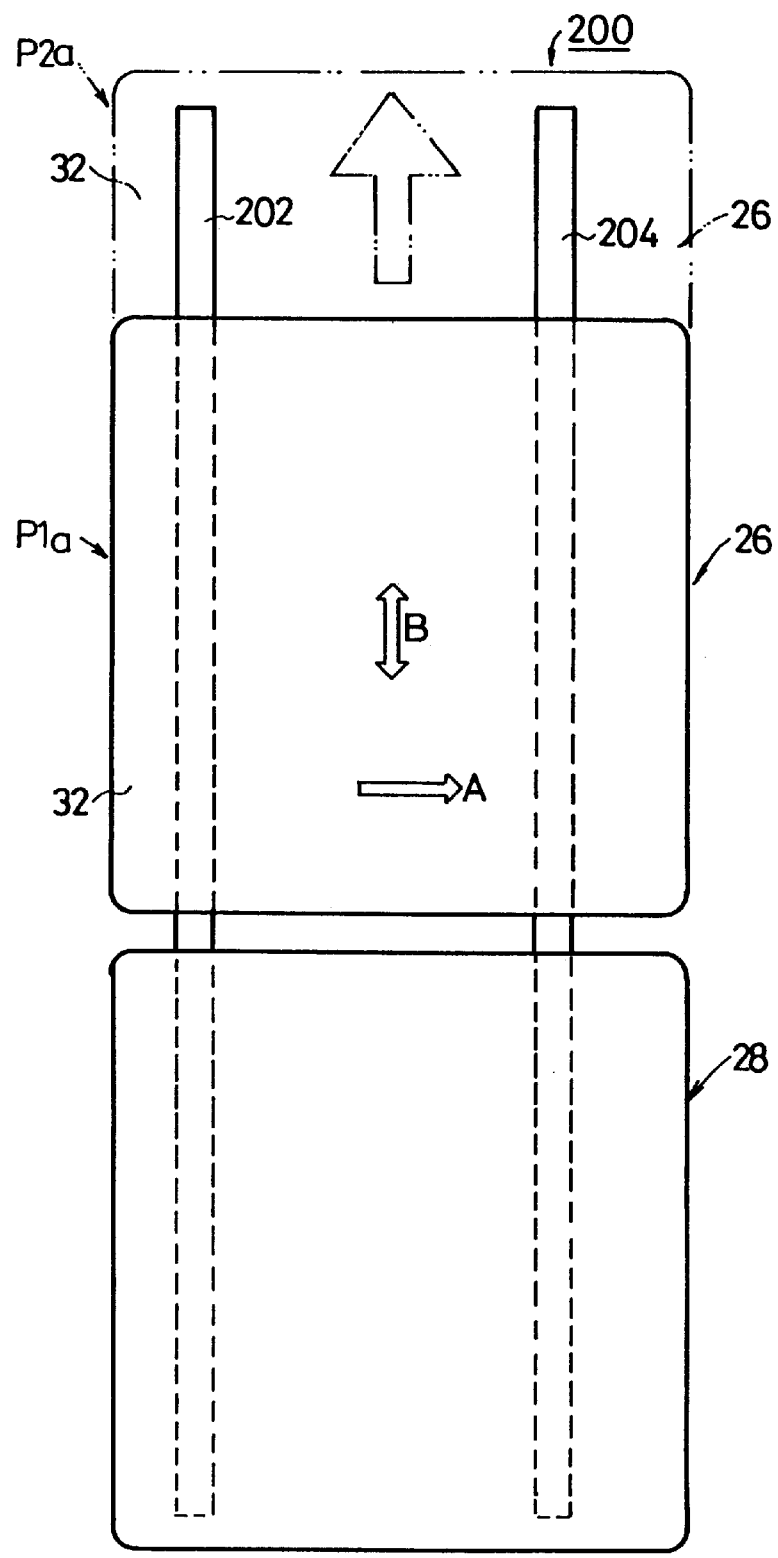
FIG. 11 is a plan view of the seat attachment structure according to the second embodiment.
Figure 12:
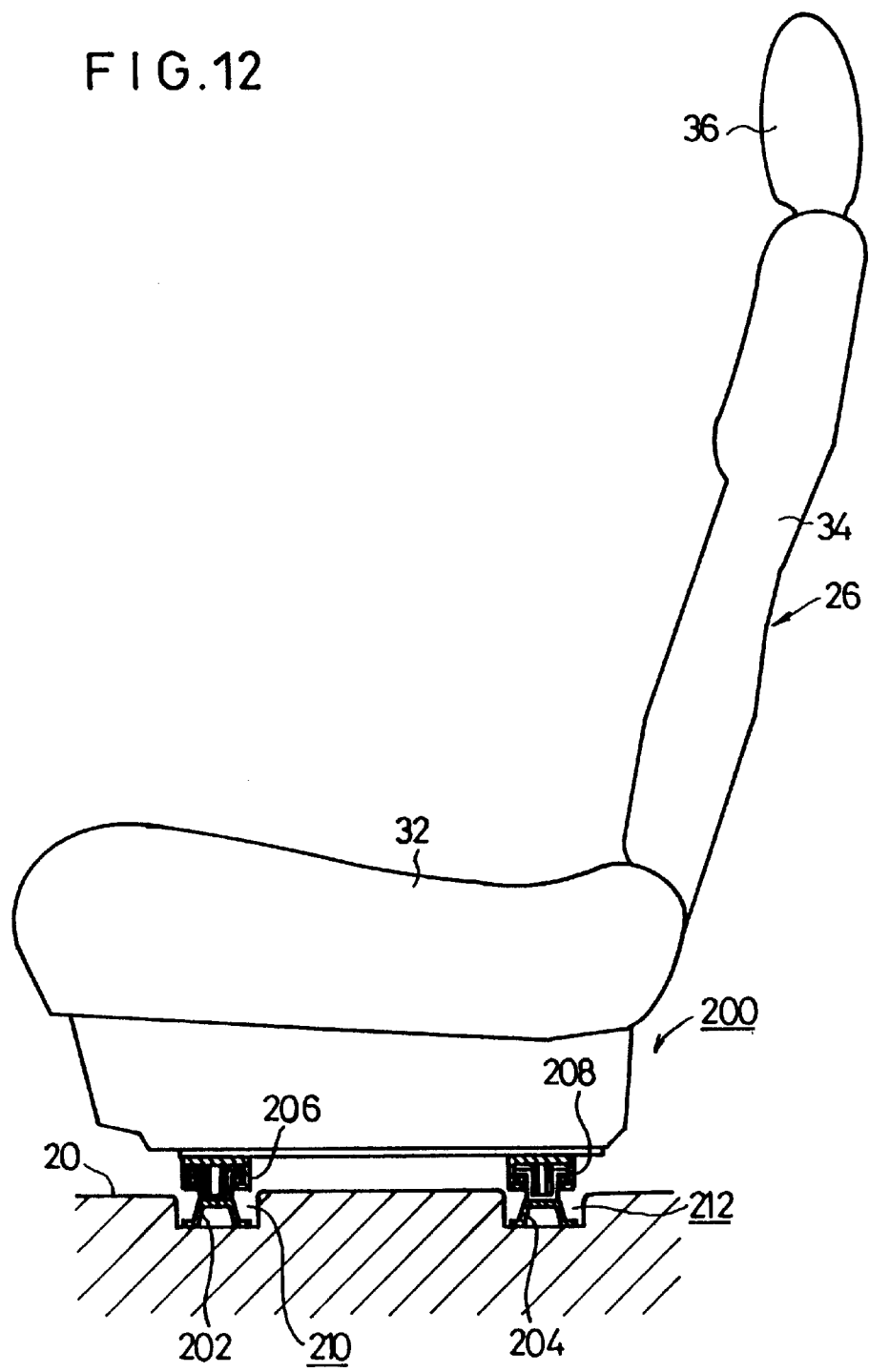
FIG. 12 is a side elevational view of the seat attachment structure according to the second embodiment.

As shown in FIGS. 10 and 11, the seat attachment structure 200 has transverse rails 202, 204 which support the first rear seat 26 for movement from a first position P1a close to the first rear seat 28 to a side position in the passenger's compartment spaced from the first rear seat 28, i.e., a second position P2a close to the side door 16a. As shown in FIG. 12, movable guides 206, 208 fixed to the lower base of the first rear seat 26 parallel to each other slidably engage the respective rails 202, 204 for moving the first rear seat 26 in the transverse direction of the motor vehicle 12.

The transverse rails 202, 204 extend parallel to each other in the transverse direction of the motor vehicle 12 indicated by the arrow B, and are positioned as low as possible on the floor 20. The transverse rails 202, 204 are received in respective recesses 210, 212 defined in the floor 20 and extending in the transverse direction of the motor vehicle 12. Alternatively, a floor carpet (not shown) placed on the floor 20 should preferably have openings (not shown) in which the transverse rails 202, 204 mounted on the floor 20 are received.

Figure 13:
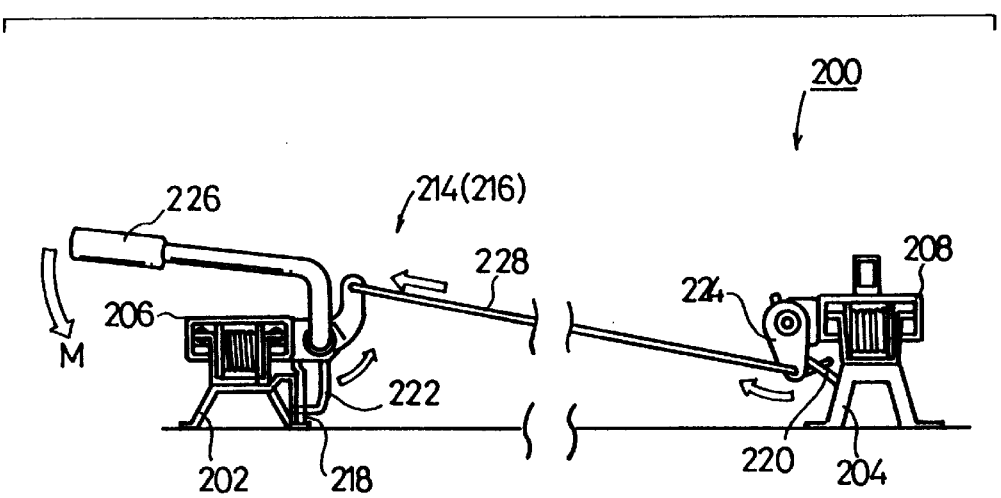
FIG. 13 is a side elevational view of a holder of the seat attachment structure according to the second embodiment.

As shown in FIG. 13, the transverse rails 202, 204 have a first holder 214 for holding the first rear seat 26 in the first position P1a close to the first rear seat 28 and a second holder 216 for holding the first rear seat 26 in the second position P2 close to the side door 16a.

Each of the first and second holders 214, 216 comprises a pair of engaging members 218, 220 fixed respectively to the transverse rails 202, 204, and a pair of latches 222, 224 angularly movably mounted on the movable guides 206, 208 for engagement with the respective engaging members 218, 220. The latch 222 is joined to a control lever 226 for being angularly movable thereby. A drive wire 228 has an end connected to the control lever 226 and an opposite end connected to the latch 224. The latches 222, 224 are normally urged toward the engaging members 218, 220 by helical springs (not shown).

For changing the layout of the first rear seat 26 from a captain seat mode shown in FIG. 10 to a bench seat mode indicated by the solid lines in FIG. 11, the control lever 226 is. turned in the direction indicated by the arrow M in FIG. 13. The latch 222 is released from the engaging member 218, causing the drive wire 228 to release the latch 224 from the engaging member 220. The first rear seat 26 is thus released from the second holder 216.

The first rear seat 26 is then moved along the transverse rails 202, 204 toward the first rear seat 28, after which the control lever 226 is released. The latches 222, 224 are then brought into engagement with the engaging members 218, 220 of the first holder 214, securing the first rear seat 26 in the bench seat mode.

In the second embodiment, as described above, the layout of the first rear seat 26 can easily be changed between the captain seat mode and the bench seat mode simply by sliding the first rear seat 26 transversely along the transverse rails 202, 204. Since it is not necessary to lift the first rear seat 26 off the floor, the first rear seat 26 can easily, smoothly, and efficiently be moved between the first and second positions P1a, P2a.

A seat attachment structure 300 according to a third embodiment of the present invention will be described below with reference to FIGS. 14 and 15. Those parts of the seat attachment structure 300 which are identical to those of the seat attachment structure 10 are denoted by identical reference characters and will not be described in detail below.

Figure 14:
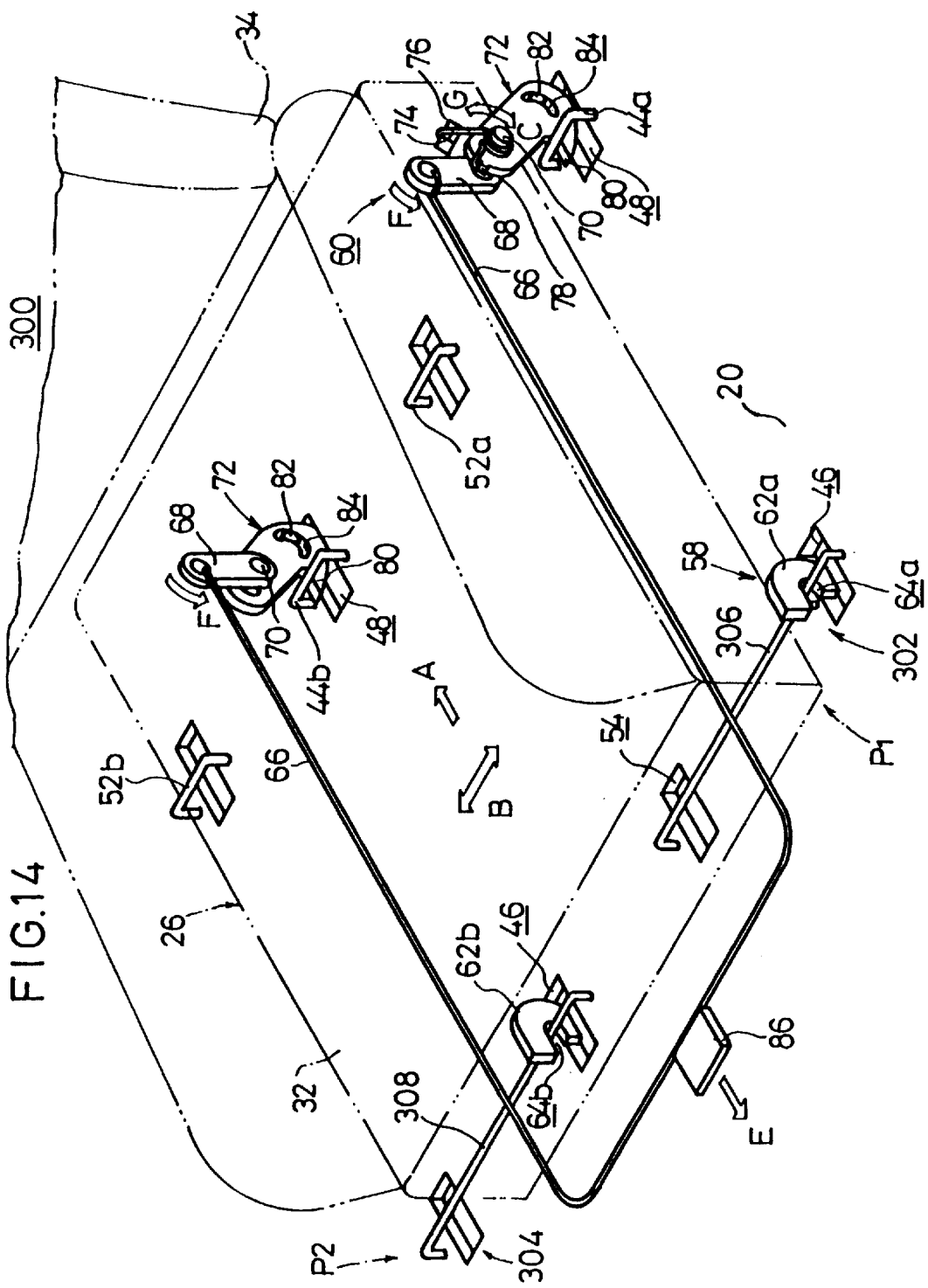
FIG. 14 is a perspective view of a seat attachment structure according to a third embodiment of the present invention.
Figure 15:
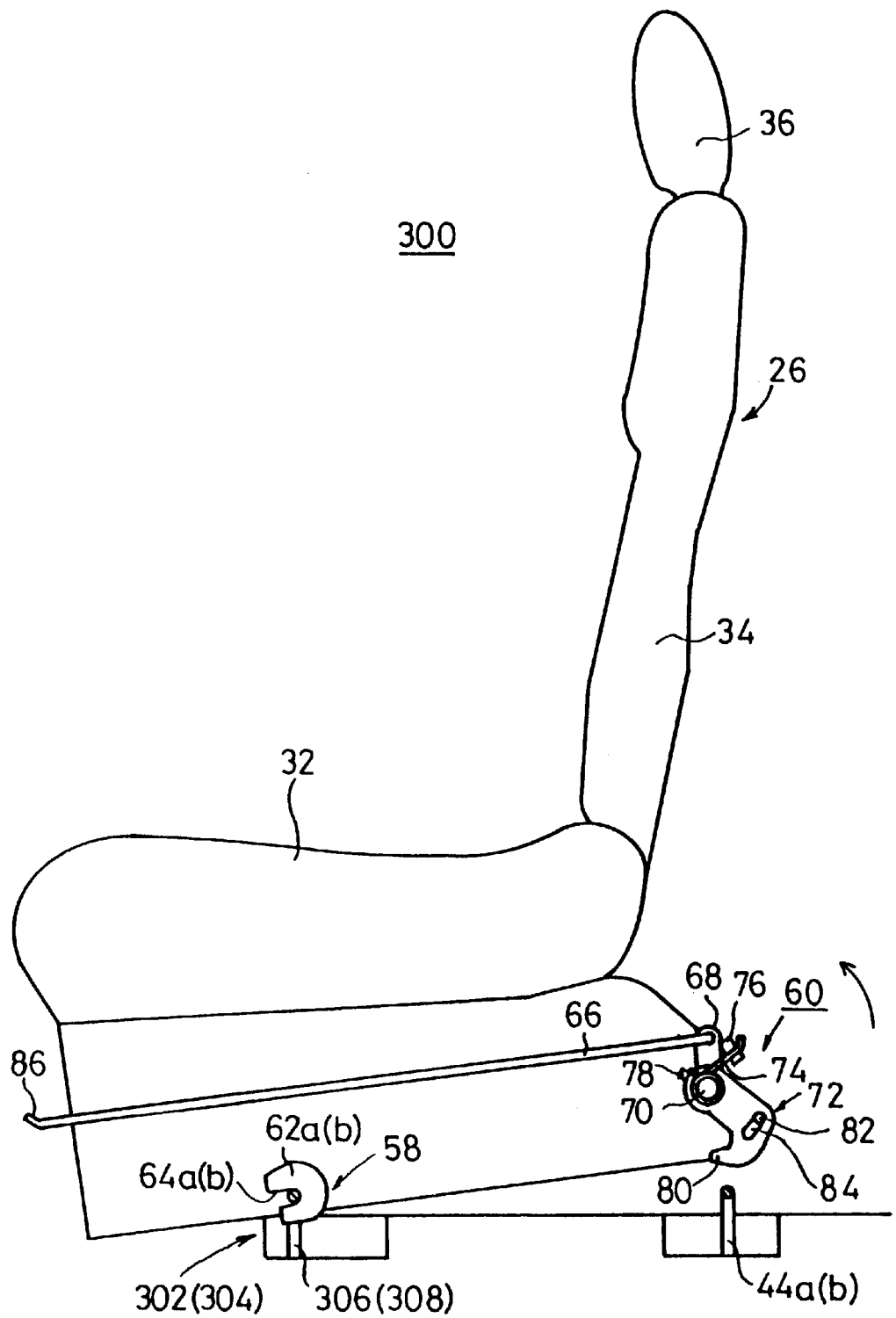
FIG. 15 is a side elevational view illustrative of the manner in which seat attachment structure according to the third embodiment operates.
Figure 16:
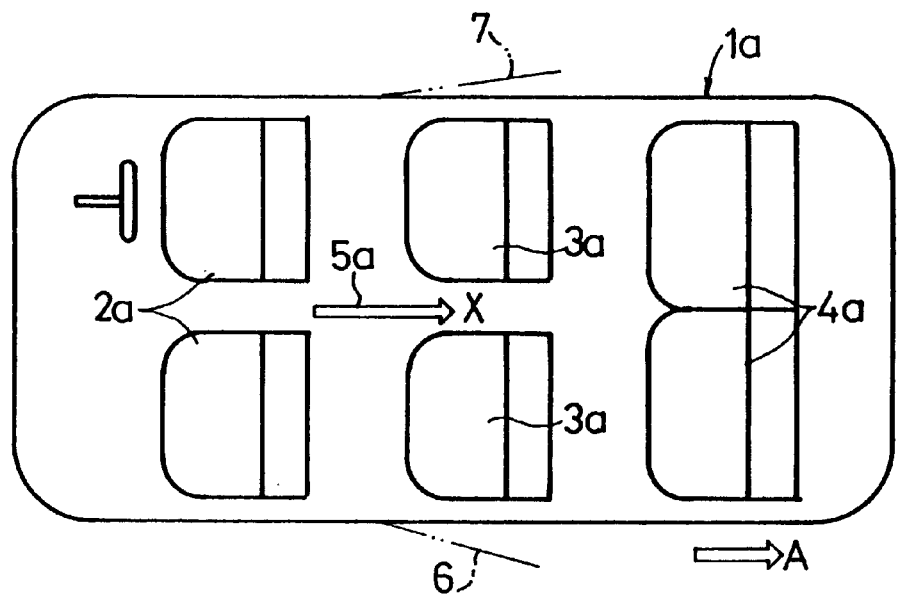
FIG. 16 is a schematic plan view of the passenger's compartment of a motor vehicle which has a central walk-through passage.
Figure 17:
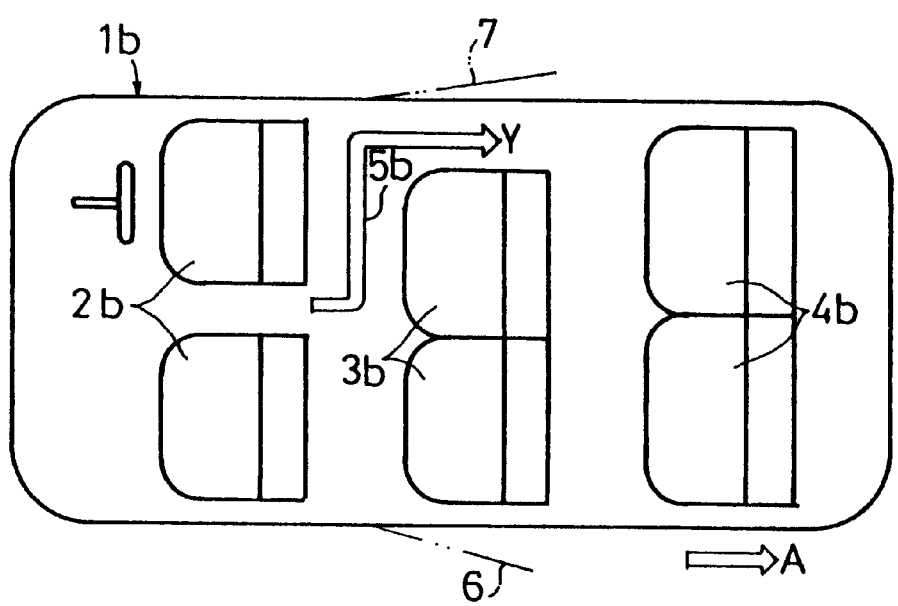
FIG. 17 is a schematic plan view of the passenger's compartment of a motor vehicle that has a bench seat behind a driver's seat.

As shown in FIGS. 14 and 15, the seat attachment structure 300 has a first holder 302 for holding the first rear seat 26 in a first position P1 close to another first rear seat (not shown) and a second holder 304 for holding the first rear seat 26 in a second position P2, i.e., a side position in the passenger's compartment, spaced from the other non-illustrated first rear seat.

The first and second holders 302, 304 have common engaging rods 306, 308 extending transversely along predetermined distances corresponding to a range in which the first rear seat 26 is movable in the transverse direction of the motor vehicle indicated by the arrow B. The common engaging rods 306, 308 perform the function of guiding the first rear seat 26 when it is moved transversely of the motor vehicle. With the hooks 62a, 62b on the front portion of the seat cushion 32 being held in engagement with the common engaging rods 306, 308, the first rear seat 26 can be moved transversely between the first position P1 and the second position P2.

For moving the first rear seat 26 transversely from the first position P1 to the second position P2, the seat attachment structure 300 operates as follows:

The control tab 86 is pulled forward in the direction indicated by the arrow E, causing the drive wires 66 to turn the levers 68 forward in the direction indicated by the arrow F. Therefore, the latches 72 fixed to the shafts 70 are turned in the direction indicated by the arrow G, releasing the fingers 80 out of engagement with the respective first strikers 44a, 44b of the first holder 302. Then, the rear end of the seat cushion 32 of the first rear seat 26 is tilted upwardly to release the lock mechanism 60, and the hooks 62a, 62b of the lock mechanism 58 remain in engagement with the engaging rods 306, 308, respectively, as shown in FIG. 15.

The first rear seat 26, while being kept in the forward tilted condition shown in FIG. 15, is moved from the first position P1 to the second position P2. At this time, the first rear seat 26 is moved transversely of the motor vehicle as the hooks 62a, 62b slide along the engaging rods 306, 308, respectively.

In the third embodiment, therefore, the user is not required to carry the entire weight of the first rear seat 26 when moving the first rear seat 26 from the first position P1 to the second position P2, and hence finds it easy to move the first rear seat 26 from the first position P1 to the second position P2. Because the hooks 62a, 62b engage the engaging rods 306, 308, respectively, at all times, the first rear seat 26 can be positioned with ease. As a consequence, the seat attachment structure 300 according to the third embodiment allows the user to move and position the first rear seat 26 quickly, smoothly, and efficiently.

With the present invention, the seat attachment structure for installing at least two passenger's seats juxtaposed transversely across the passenger's compartment of a motor vehicle has a first holder for holding at least one of the passenger's seats in a position close to another passenger's seat, and a second holder for holding the one of the passenger's seats in a side position of the passenger's compartment spaced from the other passenger's seat. The passenger's seats may be positioned closely to each other to form a bench seat, providing a walk-through passage across the side position of the passenger's compartment, or spaced from each other as captain seats, providing a central walk-through passage between the passenger's seats. Since at least one of the passenger's seats is thus selectively movable depending on the demand of the user, the seat attachment structure of the third embodiment makes the passenger's seats versatile in use.

Furthermore, the seat attachment structure has common engaging rods extending transversely of the motor vehicle along predetermined distances corresponding to a range in which one of the passenger's seats is movable transversely. When the one of the passenger's seats is moved, hooks of a retainer mechanism thereon are kept in engagement with the engaging rods at all times. Consequently, it is not necessary to detach the one of the passenger's seats off the floor of the motor vehicle, and the one of the passenger's seats can easily and reliably be moved transversely of the motor vehicle while being guided and held by the engaging rods and the hooks which engage the engaging rods.

Moreover, one of the passenger's seats is movable along transverse rails from a position close to another passenger's seat to a side position in the passenger compartment which is spaced transversely from the other passenger's seat according to the second embodiment of the invention. Since the one of the passenger's seats can be moved between those positions simply when it is slid along the transverse rails, the one of the passenger's seats can be handled smoothly and efficiently.

Although certain preferred embodiments of the present invention have been shown and described in detail, it should be understood that various changes and modifications may be made therein without departing from the scope of the appended claims. The scope of the invention is indicated by the appended claims, rather than by the foregoing description.

What is claimed is:

1. A seat arrangement and attachment structure in a motor vehicle comprising:

at least two rows of passenger's seats arranged in a longitudinal direction of the motor vehicle, including one row and another row defined by at least two passenger's seats juxtaposed transversely across a passenger compartment of the motor vehicle, wherein one of said passenger's seats is disposed adjacent to a lateral side of the motor vehicle;

transverse rails for supporting another of said passenger's seat for movement from a position closely adjacent to said one passenger's seat in a transverse direction of the motor vehicle, to a side position in the passenger compartment which is spaced from said one passenger's seat in said transverse direction;

a first holder for holding said other passenger's seat in the position closely adjacent to said one passenger's seat; and a second holder for holding said other passenger's seat in said side position in the passenger compartment which is spaced from said one passenger's seat in said transverse direction;

said first holder and second holder including engaging members fixed respectively to the transverse rails in predetermined positions, movable guides engaging said transverse rails for sliding movement in said transverse direction, latches angularly movably mounted on said movable guides, for engaging said engaging members, and a control lever coupled through a drive wire to said latches, for releasing said latches out of engagement with said engaging member.

2. A seat arrangement and attachment structure according to claim 1, wherein said control lever is disposed under said other passenger's seat.

3. A said seat attachment structure according to claim 1, wherein said transverse rails slideably support said first passenger's seats for movement between said position close to said second passenger's seat and said side position.

4. The seat arrangement and attachment structure according to claim 1, wherein said closely adjacent position and said side position overlap with each other in the transverse direction.

* * * * *

UNITED STATES PATENT AND TRADEMARK OFFICE
CERTIFICATE OF CORRECTION

PATENT NO. : 6,286,886 B1  
DATED : September 11, 2001  
INVENTOR(S) : Odagaki

Page 1 of 1

It is certified that error appears in the above-identified patent and that said Letters Patent is hereby corrected as shown below:

<u>Title page,</u>
Item "[57] ABSTRACT", change "A seat a seat" to -- A seat --.

<u>Column 6,</u>
Line 48, change "is can" to -- can --.

<u>Column 8,</u>
Line 5, change "P2" to -- P2a --;
Line 20, after "is" delete the period.

Signed and Sealed this

Twenty-sixth Day of February, 2002

Attest:

JAMES E. ROGAN
*Attesting Officer*          *Director of the United States Patent and Trademark Office*